March 22, 1927.
O. E. FULLER
GAMBREL
Filed April 3, 1926
1,622,102
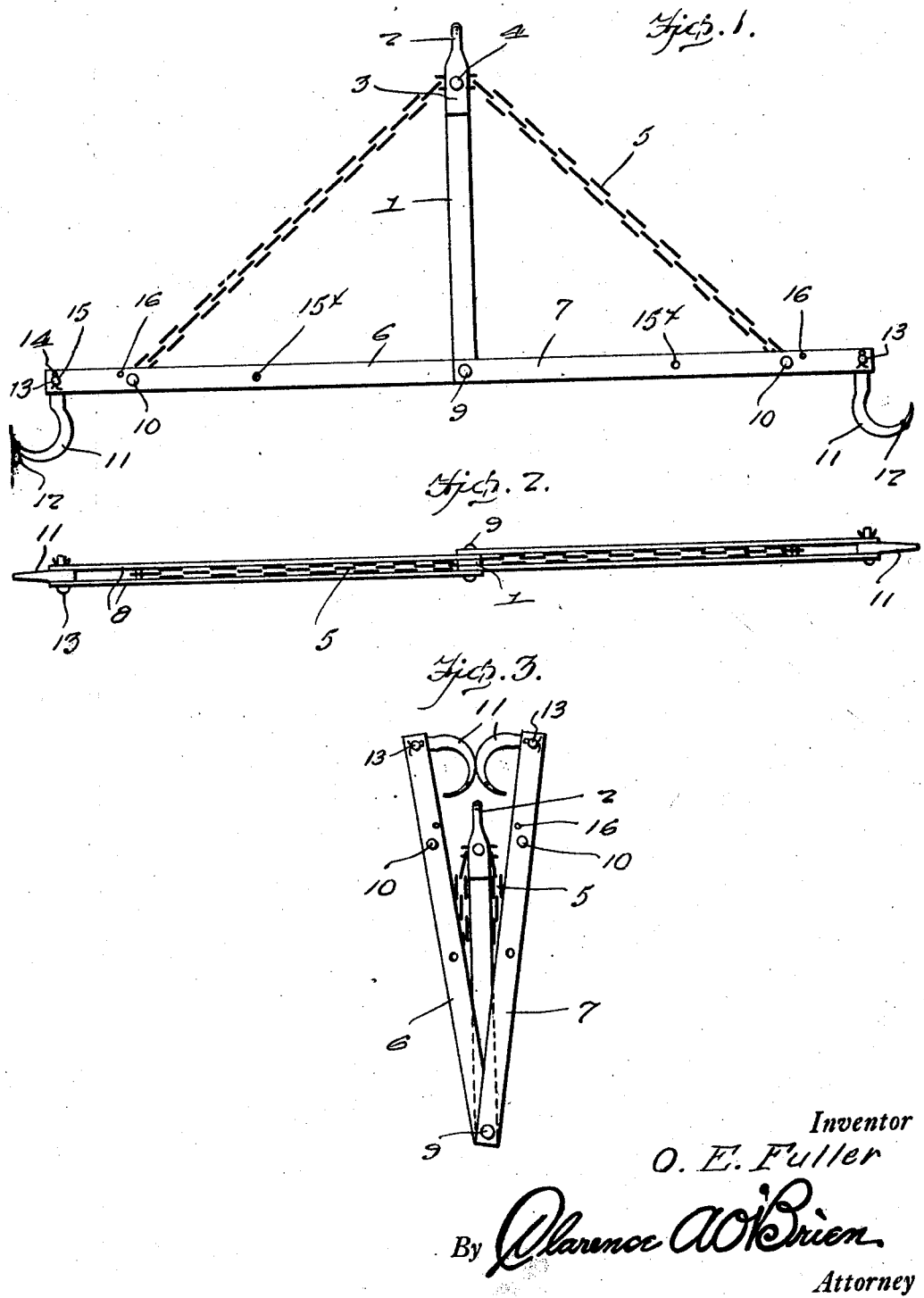
Inventor
O. E. Fuller
By Clarence A. O'Brien
Attorney Patented Mar. 22, 1927.

1,622,102

UNITED STATES PATENT OFFICE.

ORLIE E. FULLER, OF LAMONT, IOWA.

GAMBREL.

Application filed April 3, 1926. Serial No. 99,569.

The object of my said invention is the provision of a simple, strong and durable device, of foldable type, adapted to be used to advantage as a gambrel for beef and hogs, as a hay elevator, and as a singletree.

To the attainment of the foregoing, the invention consists in the improvement as hereinafter described and definitely claimed.

In the accompanying drawings, forming part of this specification:—

Figure 1 is an elevation illustrating my novel compound device as open and ready for use.

Figure 2 is a top plan view of the same.

Figure 3 is an elevation showing the device as compactly folded for storage or shipment.

Similar numerals of reference designate corresponding parts in all of the views of the drawings.

All of the parts of my novel device are formed of appropriate metal or metals, and among other elements the device comprises a body bar 1, bent at one end to form a loop 2 and having the end portion 3 of the loop 2 connected to its major portion through the medium of a rivet 4. The device also comprises a length of chain 5. Intermediate links of the said chain 5 are interposed between the end portion 3 of the loop 2 and the major portion of the bar 1, and the chain is connected to the bar 1 through the medium of the shank of the before mentioned rivet 4 which shank extends through one of the links of the chain.

In addition to the elements named the device comprises swingable arms 6 and 7. Each of the arms 6 and 7 is formed by two bars 8, and the inner end portions of the several bars 8 are arranged in lapped relation at opposite sides of the bar 1 and are hingedly connected to the bar 1 by a rivet 9 the shank of which extends through the bar 1 and also through the four bars 8. From this it follows that the arms 6 and 7 are movable from the positions shown in Figure 1 to the positions shown in Figure 3 and vice versa.

The ends of the chain length 5 are arranged between the bars 8 of the arms 6 and 7 and are connected to the said bars 8 by rivets 10 the shanks of which extend through the end links of the chain.

The device also comprises hooks 11 the free ends of which are pointed and which are provided adjacent to their free ends with transverse apertures 12 for an important purpose hereinafter set forth. The shanks of the hooks 11 are interposed between the bars 8 and are pivotally connected to the bars 8 by headed pintles 13, the said pintles 13 being removably secured in position by cotter pins 14. The shanks of the pintles 13 are shown as arranged in apertures 15 near the outer ends of the bars 8; and it will also be noticed that the bars 8 are provided with inner auxiliary holes 15ˣ, and are further provided with holes 16, the holes 16 being arranged adjacent to though spaced from the outer ends of the bars 8 and the hooks 11 being adapted to be positioned so as to put their holes 12 in registration with the holes 16 for a purpose hereinafter set forth.

When my novel device is to be used as a beef gambrel, the hooks which are then arranged as shown in Figure 1 are adapted to swing. In this use of the device the arms 6 and 7 are swung toward each other, and the cords of the animal which are found near the hock joint, are placed on the hooks, and then, through the medium of a rope connected to the loop 2 and the use of appropriate tackle, the loop 2 and the bar 1 may be moved upwardly, whereupon the device will operate to spread the legs of the animal and will hold the animal in an advantageous position for the removal of the entrails and for other purposes, such as quartering or splitting the animal.

When the device is to be used as a gambrel for hogs the pintles 13 are placed in the apertures 15ˣ for the connection of the hooks 11 to the arms 6 and 7. In the use of my novel device for elevating hay the hooks 11 are swung upwardly and inwardly until their bills are between the bars 8, whereupon cotter pins not shown are detachably secured in the apertures 12 and 16 to retain the said hooks 11 in said position. In the positions indicated the hooks 11 will securely lock hay forks to the arms 6 and 7; the said hay forks being preferably of the well known double harpoon type and being not illustrated because they per se are not of my invention.

Again my novel device is adapted to be used to advantage as a singletree on a one-horse plow or any other device, the loop 2 being connected to the plow or other device and the traces of the harness on a draft animal being connected to the hooks 11 relatively arranged to the arms 6 and 7 as shown in Figure 1.

Notwithstanding the wide range of usefulness possessed by my novel device, it will be appreciated that as a whole the device is simple and inexpensive in construction and is well adapted to withstand the usage to which gambrels, hay elevators and singletrees are ordinarily subjected.

It will further be appreciated that my novel device is reliable in operation, and is susceptible of being expenditiously and easily manipulated and as readily changed according to the use to which the device is to be put.

I have specifically described the preferred embodiment of my invention in order to impart an exact understanding of the said embodiment. I do not desire, however to be understood as limiting myself to the precise construction shown and described, my invention being defined by my appended claims within the scope of which modifications may be made without departure from my invention.

Having described my invention, what I claim and desire to secure by Letters-Patent, is:—

1. In combination, a body bar, arms hingedly connected to said body bar, said arms having transverse apertures adjacent to though spaced from their outer ends, flexible connections between intermediate points of the arms and the body bar at a point spaced from the pivotal connection of the arms to said bar, and hooks pivotally connected to the outer ends of the arms; said hooks having pointed free ends and also having adjacent to said ends transverse apertures adapted when the bills of the hooks are lapped with the arms to be registered with the said apertures of the arms for the reception of pins for securing the hooks in said positions.

2. In combination, a body bar having one end portion shaped to form a loop, a rivet extending through the end portion of said loop and also through the major portion of the body bar, hook-bearing arms pivotally connected to the body bar and a chain length connected at its ends to intermediate points of said arms and having its intermediate portion interposed between said end portion of the loop and the body bar and also having one of its links between the major portion of the body bar and the end portion of the said loop receiving the shank of the rivet by which said end portion of the loop is connected to the major portion of the bar; the said arms being respectively formed of spaced bars, and the hooks being pivotally connected to the bars of the arms by removable pintles, and the bars being provided with auxiliary apertures and being also provided with additional apertures adjacent to and spaced from the ends of the bars, and the hooks being swingable relative to the bars and the hooks being provided with points and having adjacent to said points transverse apertures adapted to be placed in registration with the last-named apertures of the bars for the reception of pins and the detachable securing of the hooks in positions in which the hooks are closed, for the purpose set forth.

In testimony whereof I affix my signature.

ORLIE E. FULLER.